United States Patent
Srivastava et al.

(10) Patent No.: US 10,425,315 B2
(45) Date of Patent: Sep. 24, 2019

(54) INTERACTIVE PERSONAL DIGITAL ASSISTANT DEVICE

(71) Applicant: INTERNATIONAL BUSINESS MACHINES CORPORATION, Armonk, NY (US)

(72) Inventors: Biplav Srivastava, Rye, NY (US); Kartik Talamadupula, Yorktown Heights, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 271 days.

(21) Appl. No.: 15/450,444

(22) Filed: Mar. 6, 2017

(65) Prior Publication Data
US 2018/0254967 A1    Sep. 6, 2018

(51) Int. Cl.
*G06F 15/173*   (2006.01)
*H04L 12/26*   (2006.01)
(Continued)

(52) U.S. Cl.
CPC .......... *H04L 43/10* (2013.01); *H04L 41/5054* (2013.01); *H04L 51/02* (2013.01);
(Continued)

(58) Field of Classification Search
CPC ..... H04L 43/10; H04L 41/5054; H04L 51/02; H04L 67/26; H04L 41/5093; H04L 41/0266; H04L 41/0286
See application file for complete search history.

(56) References Cited

U.S. PATENT DOCUMENTS 9,767,263 B1 *   9/2017   McInerny ............... G06F 21/31
2001/0047261 A1   11/2001   Kassan
(Continued)

FOREIGN PATENT DOCUMENTS

| WO | 0167225 | 9/2001 |
| WO | 2007041223 | 4/2007 |
| WO | 2014033494 | 3/2014 |

OTHER PUBLICATIONS

Panisson, Alison R., et al., "Towards Practical Argumentation-Based Dialogues in Multi-agent Systems", 2015 IEEE/WIC/ACM International Conference on Web Intelligence and Intelligent Agent Technology, pp. 151-158.

*Primary Examiner* — Padma Mundur
(74) *Attorney, Agent, or Firm* — F. Chau & Associates, LLC (57) ABSTRACT

A personal digital assistant device includes: a memory storing an interactive personal digital assistant program and a processor configured to execute the interactive personal digital assistant program. The interactive personal digital assistant program performs an operation to determine whether the service provider is automated or is not automated. The interactive personal digital assistant program is configured to issue a command to the service provider on behalf of a user of the device, when it is determined that the service provider is automated. The interactive personal digital assistant program is configured to issue an alert on the device when it is determined that the service provider is not automated. The interactive personal digital assistant program may continue until the goal of the interaction is met or human help is sought.

17 Claims, 10 Drawing Sheets

(51) Int. Cl.
*H04L 29/08* (2006.01)
*H04L 12/58* (2006.01)
*H04L 12/24* (2006.01)

(52) U.S. Cl.
CPC .......... *H04L 67/26* (2013.01); *H04L 41/0266* (2013.01); *H04L 41/0286* (2013.01); *H04L 41/5093* (2013.01)

(56) References Cited

U.S. PATENT DOCUMENTS

| | | | |
|---|---|---|---|
| 2004/0019476 A1* | 1/2004 | Glynn | H04M 3/4938 |
| | | | 704/1 |
| 2004/0107196 A1* | 6/2004 | Chen | H04L 67/02 |
| 2005/0234928 A1* | 10/2005 | Shkvarchuk | H04L 67/2823 |
| 2009/0006897 A1* | 1/2009 | Sarsfield | G06F 11/3684 |
| | | | 714/38.14 |
| 2012/0195517 A1* | 8/2012 | Mittur | G06F 21/31 |
| | | | 382/254 |
| 2014/0297268 A1 | 10/2014 | Govrin et al. | |
| 2015/0262572 A1 | 9/2015 | Kelly et al. | |
| 2016/0099842 A1 | 4/2016 | Krishnamoorthy et al. | |
| 2017/0324867 A1* | 11/2017 | Tamblyn | H04M 3/5191 |
| 2017/0358296 A1* | 12/2017 | Segalis | G06N 20/00 |
| 2018/0077181 A1* | 3/2018 | Chen | H04L 63/1425 |

* cited by examiner

```
<process name ="TripHandling">
  <partners>
    <partner name ="FlightService"
      myRole ="TripHandlingAgent"
      serviceLinkType ="InternalServiceLink"
      partnerRole ="FlightServiceAgent"/>
    <partner name ="HotelService"
      myRole ="TripHandlingAgent"
      serviceLinkType ="InternalServiceLink"
      partnerRole ="HotelServiceAgent"/>
    <partner name ="CarService"
      myRole ="TripHandlingAgent"
      serviceLinkType ="ExternalServiceLink"
      partnerRole ="CarServiceAgent"/>
  </partners>
  <flow>
    <invoke partner ="FlightService">
    </invoke>
    <invoke partner ="HotelService">
    </invoke>
    <invoke partner ="CarService">
    </invoke>
    ...
  </flow>
  ...
</process>
```

INTERACTIVE PERSONAL DIGITAL ASSISTANT DEVICE

BACKGROUND

1. Technical Field

The present disclosure relates generally to an intelligent personal digital assistant, and more particularly to an intelligent personal digital assistant device capable of communicating with an intelligent digital assistant of a service provider.

2. Discussion of Related Art

A personal assistant application (e.g., a digital assistant) is commonly run on a smart phone or intelligent device. Personal assistant applications may respond to user input, including, for example, voice-based input, often taking the form of a query or command. Based on the received user input, a personal assistant application may perform tasks by utilizing location awareness and accessing information stored on the smart device and web services. In doing so, the application appears to answer questions, make recommendations, and perform other actions. A digital assistant may perform pointed actions in response to user commands, including, for example, sending a message to a particular person or scheduling a specific meeting at a specific time in a calendar.

Existing personal assistant applications are capable of performing an increasing number of commands, but existing digital assistants are not capable of interacting with another digital assistant.

BRIEF SUMMARY

A personal digital assistant device according to an exemplary embodiment of the inventive concept includes: a memory storing an interactive personal digital assistant program and a processor configured to execute the interactive personal digital assistant program. The interactive personal digital assistant program performs an operation to determine whether the service provider is automated or is not automated. The interactive personal digital assistant program is configured to issue a command to the service provider on behalf of a user of the device, when it is determined that the service provider is automated. The interactive personal digital assistant program is configured to issue an alert on the device when it is determined that the service provider is not automated.

A computer-implemented method for controlling a personal assistant device to interact with a service provider according to an exemplary embodiment of the inventive concept includes: performing, by a processor, an operation to determine whether the service provider is automated or not automated; issuing, by the processor, a command to the service provider on behalf of a user of the device when it is determined that the service provider is automated; and issuing, by the processor, an alert on the device when it is determined that the service provider is not automated.

A computer program product for controlling a personal assistant device to interact with a service provider according to an exemplary embodiment of the inventive concept is provided. The computer program product comprising a computer readable storage medium having program instructions embodied therewith, wherein the program instructions are executable by a processor to perform a method including: performing, by a processor, an operation to determine whether the service provider is automated or not automated; issuing, by the processor, a command to the service provider on behalf of a user of the device when it is determined that the service provider is automated; and issuing, by the processor, an alert on the device when it is determined that the service provider is not automated.

BRIEF DESCRIPTION OF THE SEVERAL VIEWS OF THE DRAWINGS

Exemplary embodiments of the invention can be understood in more detail from the following descriptions taken in conjunction with the accompanying drawings in which.

DETAILED DESCRIPTION OF THE EXEMPLARY EMBODIMENTS

The inventive concept will be described in more detail with reference to the accompanying drawings, where exemplary embodiments of the present disclosure have been illustrated. Throughout the drawings, same or like reference numerals are used to represent the same or like components. However, the present inventive concept can be implemented in various manners, and thus should not be construed to be limited to the embodiments disclosed herein. On the contrary, those embodiments are provided for the thorough and complete understanding of the present disclosure to convey the scope of the present disclosure to those skilled in the art.

Figure 1:
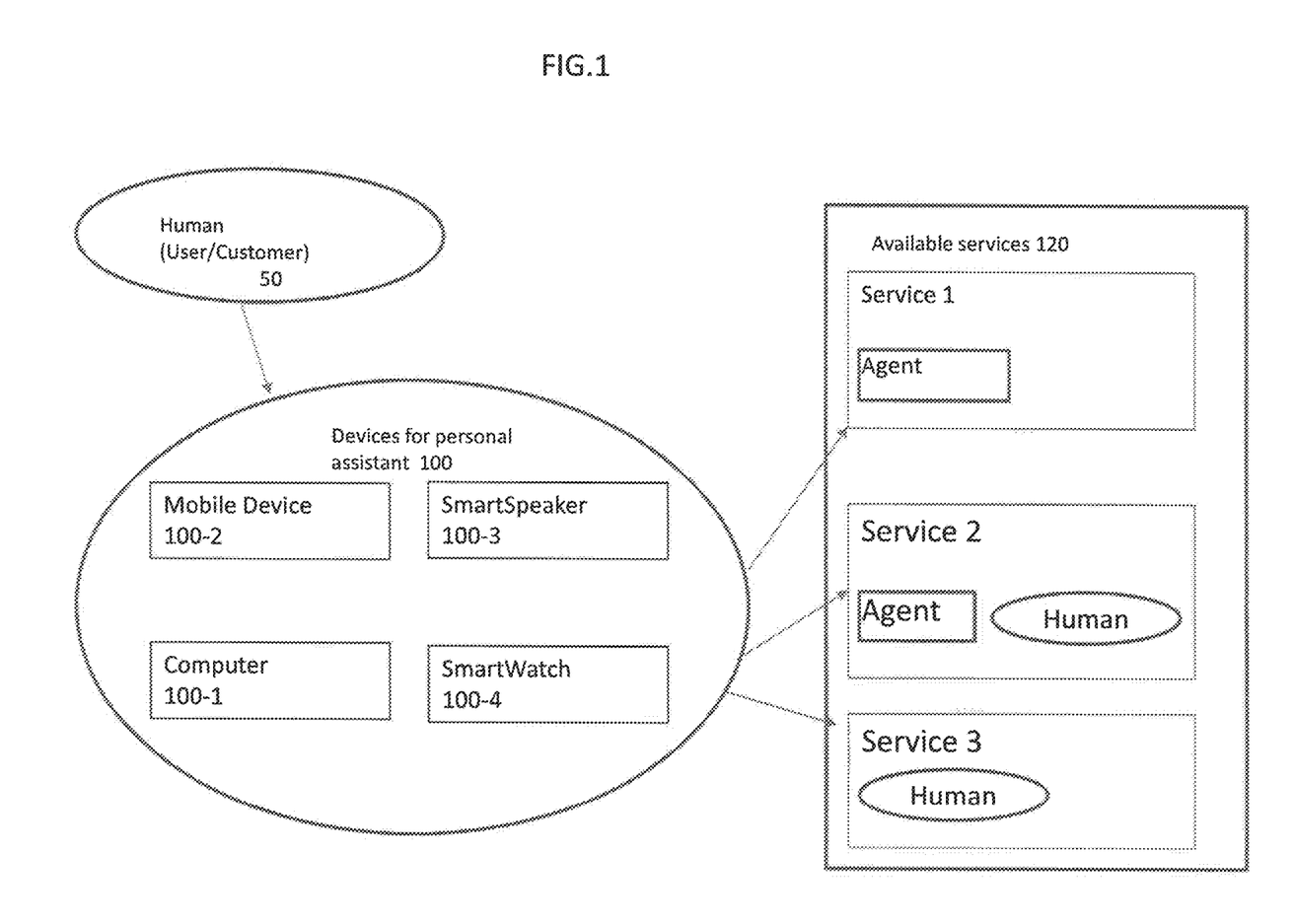
FIG. 1 shows devices capable of housing a personal digital assistant that requests services for a user.

FIG. 1 illustrates a human being 50 (e.g., a user/customer) interacting with one or more personal digital assistant devices 100. For example, the personal digital assistant devices 100 may include a computer 100-1, a mobile device 100-2 (e.g., a smartphone), a smartspeaker 100-3, or a smartwatch 100-4.

Each of the personal digital assistant devices is capable of running the personal digital assistant according to the inventive concept, which is capable of accessing the available services 120 on behalf of the user 50.

FIG. 1 shows that the first service (i.e., Service 1) is only provided by an automated agent (e.g., an intelligent computer program), the second service (i.e., Service 2) is provided by an automated agent or a human, and the third service (i.e., Service 3) is only provided by a human. For example, the second service could start off using the automated agent, and once the interaction progresses to a certain state it could then switch the user to an actual human being. For example, when a user accesses a website of a business, the user could be interacting with a chat window that is managed by the automated agent initially to answer basic questions of the user. However, when the questions become more complex and the automated agent is unable to answer them, the automated agent can connect the user to a human operator. For example, the automated agent can send a computer message to a terminal of the human operator that provides a selectable link to the human operator that when selected by the human operator, opens a chat window that enables the human operator to continue the chat with the user where the automated agent left off.

Figure 2:
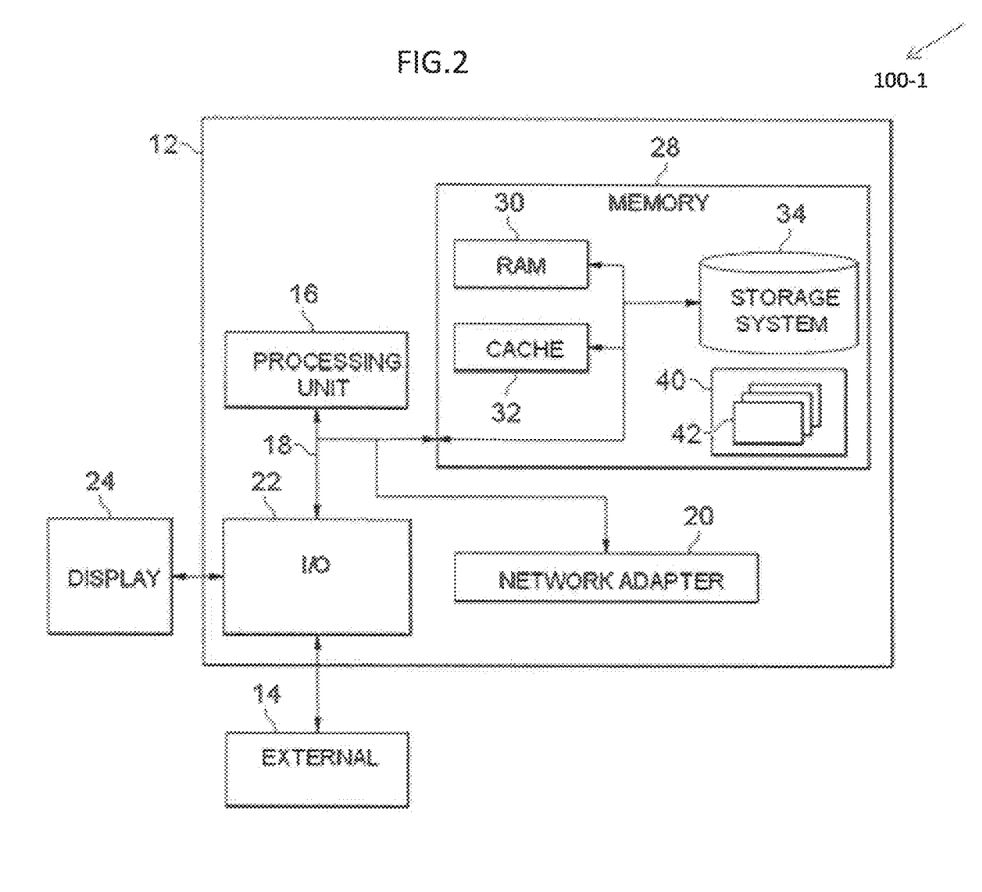
FIG. 2 shows an exemplary computer system which may be execute the personal digital assistant.

FIG. 2 illustrates a computer system/server that may be used to implement the computer 100-1 of FIG. 1. The computer system/server 12 is shown in the form of a general-purpose computing device. The components of the computer system/server 12 may include, but are not limited to, one or more processors or processing units 16, a system memory 28, and a bus 18 that couples various system components including system memory 28 to processor 16. The system memory 28 may store the personal digital assistant for execution by the processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

The computer system/server 12 may include a variety of computer system readable media. Such media may be any available media that is accessible by the computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/non-volatile computer system storage media. By way of example, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

A program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. The computer system/server 12 can communicate with one or more networks such as a local area network (LAN), a general wide area network (WAN), and/or a public network (e.g., the Internet) via a network adapter 20. As depicted, the network adapter 20 communicates with the other components of computer system/server 12 via the bus 18. It should be understood that although not shown, other hardware and/or software components could be used in conjunction with the computer system/server 12. Examples of these other hardware and/or software components include, but are not limited to: microcode, device drivers, redundant processing units, external disk drive arrays, RAID systems, tape drives, and data archival storage systems.

Figure 3:
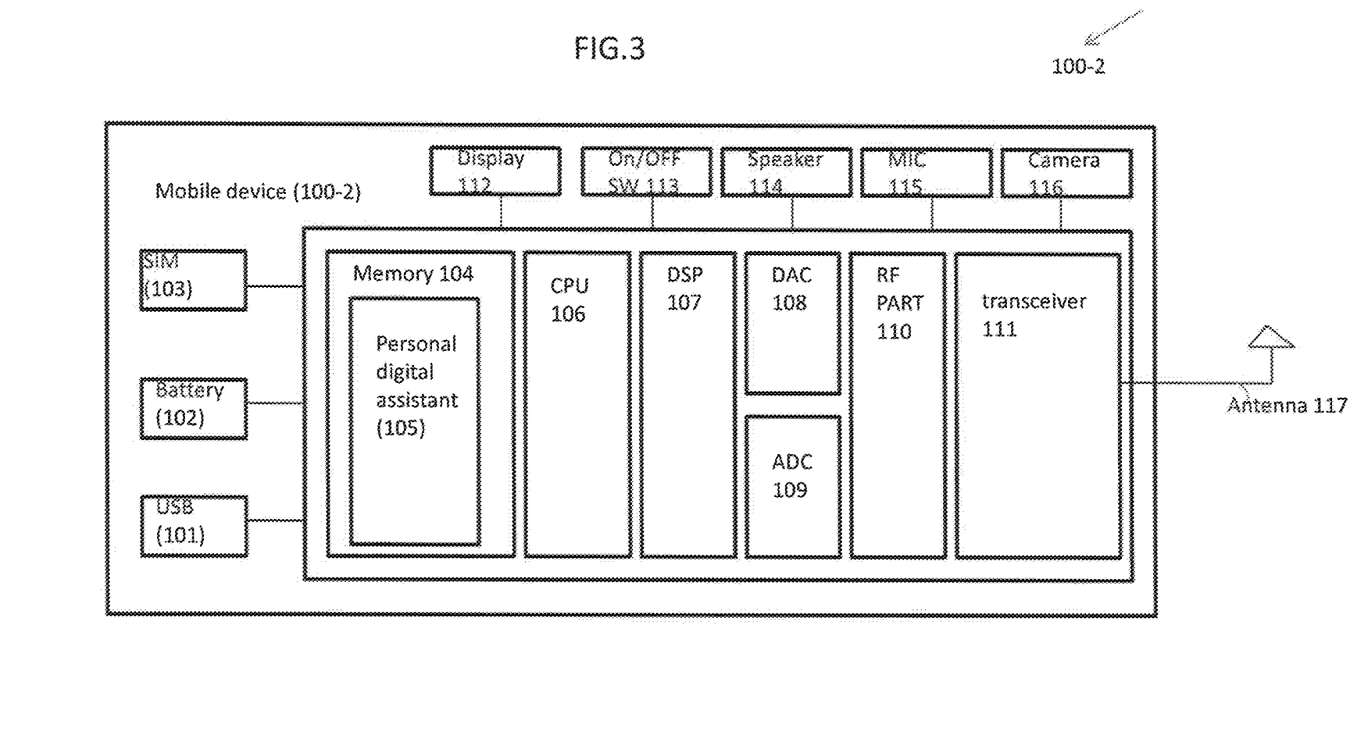
FIG. 3 shows an exemplary mobile device which may execution the personal digital assistant.

FIG. 3 illustrates a mobile device that may be used to implement the mobile device 100-2 of FIG. 1.

The mobile device 100-2 includes a USB port 101, a battery 102, a SIM card 103, a memory 104, a CPU 106, a digital signal processor (DSP) 107, a digital to analog converter (DAC) 108, an analog to digital converter (ADC) 109, an a radio frequency (RF) part 110, a transceiver 111, a display 112, an on/off switch (SW) 113, a speaker 113, a microphone (MIC) 115, a camera 116, and an antenna.

The RF part 110 may include an up converter and a down converter. The upconverter converts a modulated baseband signal to an intermediate frequency (IF) or to an RF frequency. The down converter converts an RF signal to a baseband signal. The antenna 117 is a metallic object that converts electro-magnetic signals to an electric signal and vice versa. The transceiver 116 may includes a transmitter/receiver switch to connect both a transmit path and a receive path with the single antenna 117. The ADC 109 and the DAC 108 may be used to convert an analog speech signal to a digital signal and vice versa.

The CPU 106 is configured to execute various applications including a mobile operating system and an intelligent personal digital assistant 105 according to an embodiment of the invention that may be stored in memory 104. The transceiver 111 may enable the mobile device 100-2 to communicate using various wireless communication protocols such as BLUETOOTH. The mobile device 100-2 may additionally include global positioning system (GPS) circuitry and corresponding software used for location assistance.

The SmartSpeaker 100-3 and SmartWatch 100-4 implementations of the personal digital assistant device may include many of the same components as those shown in FIG. 3. For example, the SmartSpeaker 100-3 could include a larger speaker than the speaker 114 of the mobile device 100-2, but omit the SIM card 103, the camera 116, and the display 112, and the SmartWatch 100-4 could omit the SIM card 103 when it is paired to a smartphone.

Figure 4:
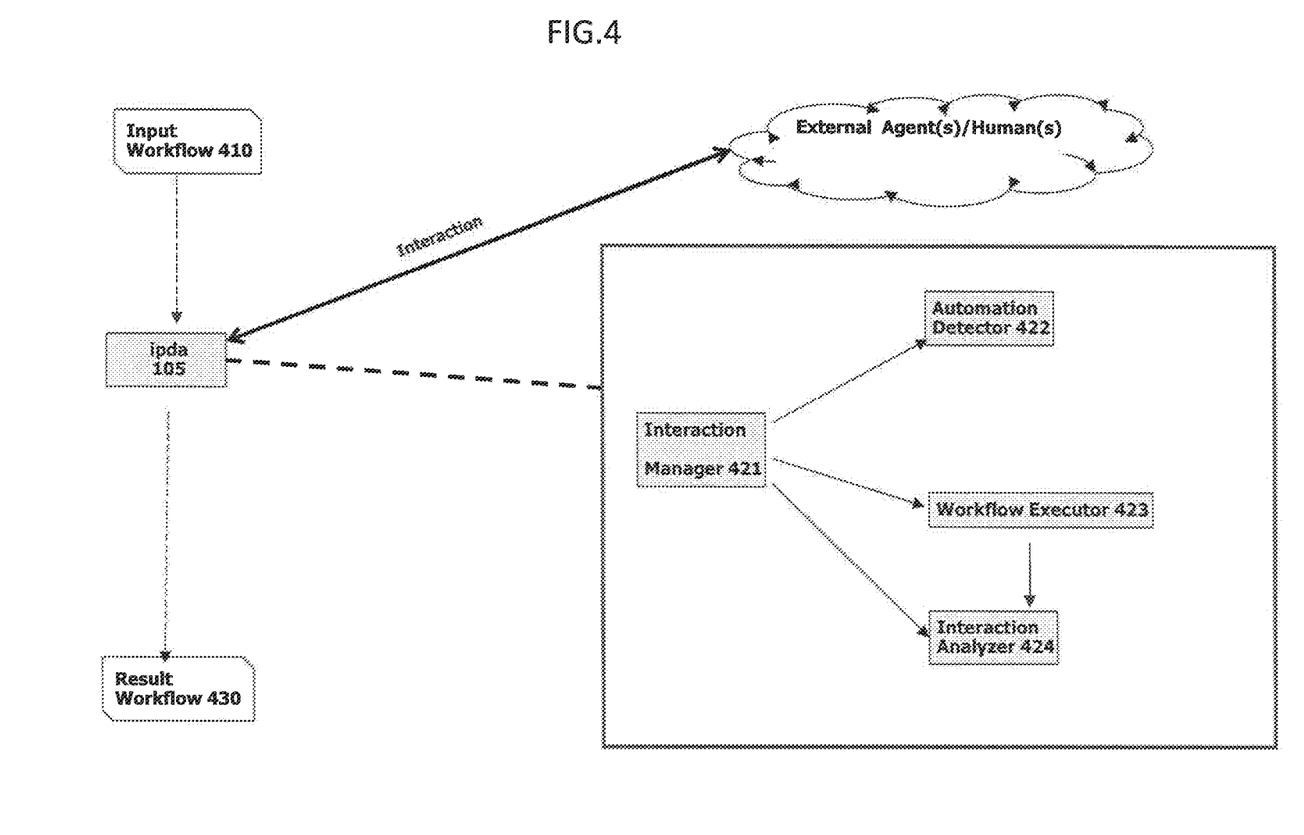
FIG. 4 shows a data flow diagram of a personal digital assistant according to an exemplary embodiment of the inventive concept.

FIG. 4 shows a data flow diagram of an interactive personal digital assistant (IPDA) 105, according to an exemplary embodiment of the inventive. The IPDA 105 is configured to automatically interact with one or more external automated agents and/or human operators based on an input workflow 410.

In an exemplary embodiment, an external automated agent provides one or more services using one or more web service. A web service is a self-contained, modular unit of application logic which provides business functionality to other applications via an Internet connection. Web services support the interaction of business partners and their processes by providing a stateless model of "atomic" synchronous or asynchronous message exchanges. These "atomic" message exchanges can be composed into longer business interactions by providing message exchange protocols that show the mutually visible message exchange behavior of each of the partners involved.

The Web Services Definition language (WSDL) is an XML-based language, which specifies a Web service by defining messages that provide an abstract definition of the data being transmitted and operations that a Web Service provides to transmit the messages. Four types of communication are defined involving a service's operation (endpoint): the endpoint receives a message (one-way), sends a message (notification), the endpoint receives a message and sends a correlated message (request-response), and it sends a message and receives a correlated message (solicitresponse). Operations are grouped into port types, which describe abstract end points of a Web service such as a logical address under which an operation can be invoked. A WSDL message element defines the data elements of an operation. XML Schema syntax is used to define platform-independent data types which messages can use. Each message can consist of one or more parts. The parts can be compared to the parameters of a function call in a traditional programming language. Concrete protocol bindings and physical address port specifications complete a Web Service specification.

A Web Service is viewed like a remote procedure call (RPC). The exact control and data flow that determines when an operation can execute is provided in a flow composition language like BPEL4WS.

The external automated agent may discover these Web Services by searching a Universal Description Discovery and Integration (UDDI) directory, which is an XML-based registry for business internet services. The IPDA 105 may store information identifying the location of the UDDI directory (e.g., website name and directory name) or have access to such information.

A UDDI business registration consists of three components, white pages, yellow pages, and green pages. White pages give information about the business supplying the service. Yellow pages provide a classification of the service of business. Because a single business may provide a number of services, there may be several yellow pages associated with one white page. Green pages are used to describe how to access a Web Service, with information on the service bindings. Since a Web Service may have multiple bindings (as defined in its WSDL description) a service may have multiple Green pages, as each binding will need to be accessed differently.

The external automated agent may select one or more Web Service instances based on user information indicating a request for a particular service and a preference for a particular business. For example, if the external automated agent is programmed to manage booking of an airline ticket, and it receives information from a user indicating a preference for UNITED airlines and AMERICAN airlines, it can select "AmericanFlightBookingService" and "UnitedFlightBookingService", which are instances of a generic Web Service such as "OnlineFlightBookingService". The external automated agent then selects a binding mechanism such as the Simple Object Access Protocol (soap) for communicating with the Web Service. SOAP is an extensible markup language (XML) message, which is used to transmit data to a Web Service. WSDL is an XML document which describes how to connect and make requests to the Web Service.

Figure 5:
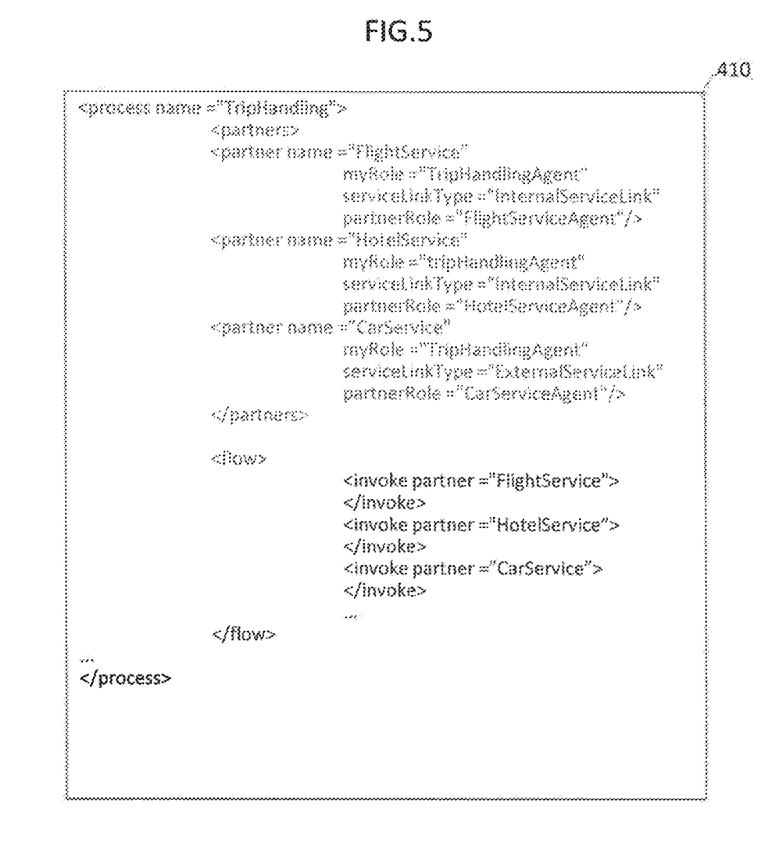
FIG. 5 shows an exemplary input workflow that may be operated by the personal digital assistant.

In an exemplary embodiment, the input workflow 410 is in a XML format. FIG. 5 illustrates an example of an input workflow 410. In this example, the user 50 wants to book a flight, a hotel, and a car.

For example, the user 50 may have previously issued a sequence of commands (e.g., voice commands) to the personal assistant device (e.g., 100-1, 100-2, 100-3, or 100-4), and in response to those voice commands, the personal assistant device may have converted those commands into the input workflow 410. For example, the user 50 could have issued voice commands through the MIC 115 such as "personal assistant, book an airline ticket from NYC to Rome leaving at a certain date and arriving at a certain date, book a hotel reservation in Rome during those dates, and book a rental car in Rome during those dates". The IPDA 105 could then have converted the voice into text, parsed through the text for the relevant workflow parts (e.g., book airline ticket; book hotel; and book rental car), and converted the workflow parts into the input workflow 410 shown in FIG. 5. While the above describes use of voice commands by the user 50, the invention is not limited thereto. For example, the user 50 could have instead entered these commands into a graphical user interface presented on display 112.

The IPDA 105 cannot request one or more services based on the input workflow 410, because the input workflow 410 does not identify an operation group and a port type that indicates a specific operation of a Web Service within the operation group to call. The port type may describe a logical address under which the operation can be invoked. In an embodiment, the format of the input workflow 410 is derived by analyzing the UDDI directory. For example, the UDDI directory may identify Web service instances (e.g., "FlightService", "HotelService", and "CarService") that can be invoked by service providers. The input workflow 410 may include an XML tag (e.g., "partner name") that identifies the Web service instance.

Referring back to FIG. 4, the interaction manager 421 of the IPDA 105 receives the input workflow 410.

Figure 6:
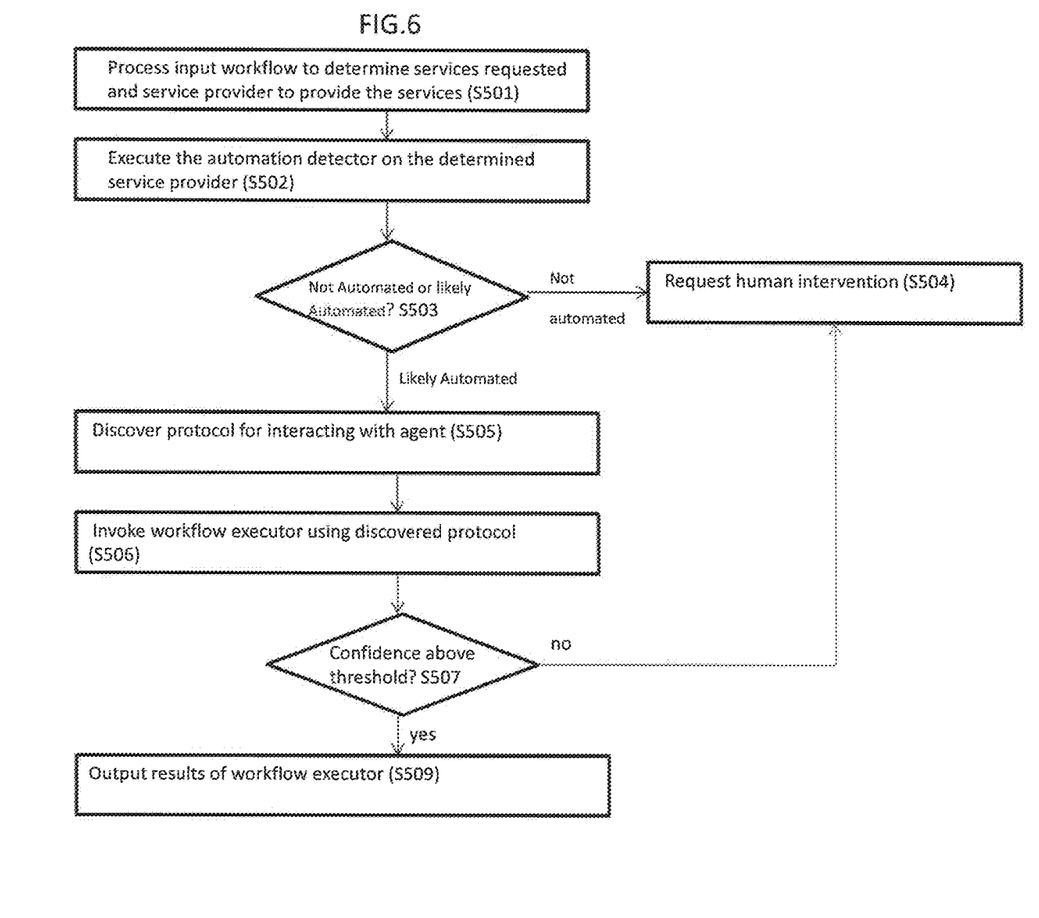
FIG. 6 illustrates a method of operating an interaction manager of the personal digital assistant according to an exemplary embodiment of the inventive concept.

FIG. 6 illustrates a method of operating the interaction manager 421 according to an exemplary embodiment of the inventive concept.

The method includes the interaction manager 421 processing the input workflow 410 to determine services requested by the user and a service provider to provide the requested services (S501). The processing of the input workflow 410 may includes parsing the input workflow 410 to determine the requested service. For example, the interaction manager 421 understands that if it encounters a token such as invoke partner="FlightService" the user 50 wants to book a flight, encounters a token such as invoke partner="HotelService" the user 50 wants to book a hotel, and encounters a token such as invoke partner="CarService" the user wants to rent a car. Further, the token may indicate a specific Web Service instance to invoke (e.g., "FlightService", "HotelService", or "CarService". The determination of the service provider may include determining an internet protocol (IP) address of the service provider. The IP address may be determined by searching the UDDI directory. For example, the UDDI directory may identify an invokable service along with its corresponding IP address, port number, and function signature (e.g., function name, input parameters, and output parameters). However, the inventive concept is not limited to these services, these tokens, or these Web Service instances as they are merely provided as examples.

While not shown in FIG. 5, the input workflow 410 may include additional information to enable these services to be invoked, such as the departure city, the departure date, the destination city, departure date, return date, etc., or this additional information may be provided in a file referred hereinafter as agent-directives. Examples of the agent-directives include an interaction confidence threshold, a level of automation (e.g., automatic, semi-automatic), a state requiring human review (e.g., pre-payment), a solution set size (e.g., a number), an objective (e.g., minimize cost, minimize time, etc.), preferred resources (e.g., airline preferences, hotel preferences, rental car or car type preferences, travel booking website preferences). The interaction manager 421 may have access to a list of service providers (e.g., websites addresses) that perform the determined services and the interaction manager 421 can use the agent-directives to select only a few of these service providers.

The method next executes the automation detector 422 using the extracted service providers (S502). The goal of the automation detector 422 is to establish a connection to the selected service provider and to determine whether the corresponding service provider is using an intelligent automated agent to provide automatic responses to queries or a human operator. For example, if the automation detector 422 accesses a travel website, a chat window program could be available that is managed by a human or an automated agent.

Figure 7:
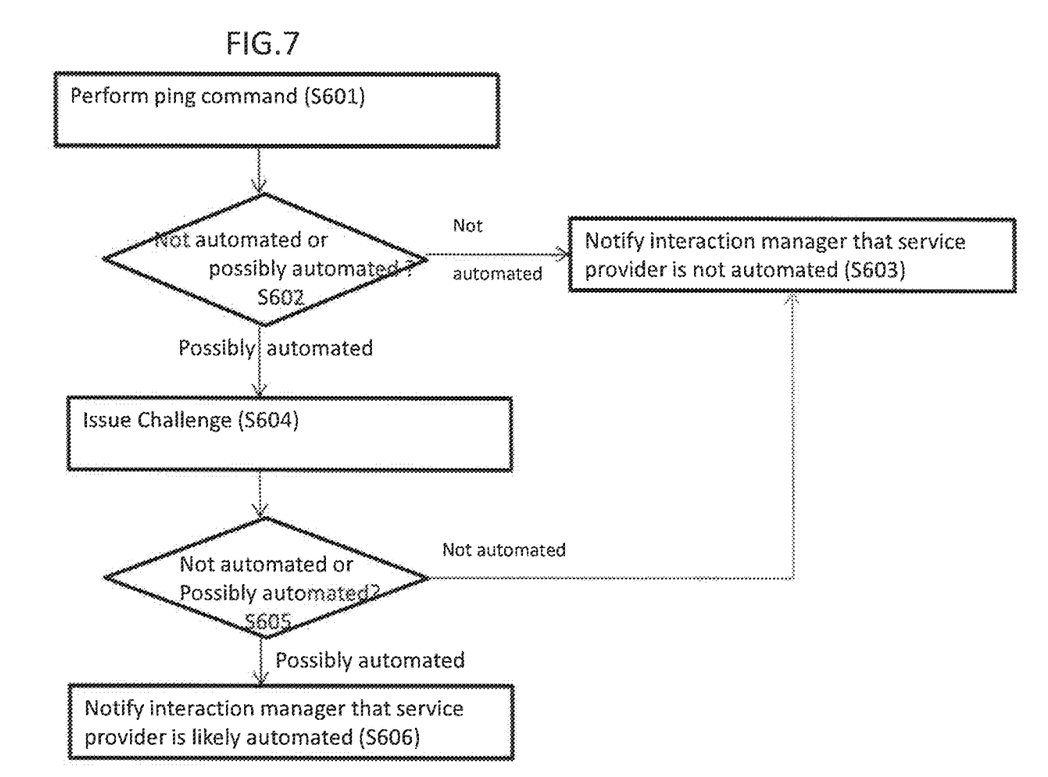
FIG. 7 illustrates a method of operating an automation detector of the personal digital assistant according to an exemplary embodiment of the inventive concept.

FIG. 7 illustrates a flow diagram for a method of executing the automation detector 422 according to an exemplary embodiment of the invention. The method includes performing a ping command on the determined service provider (S601). In an exemplary embodiment, once the IP address of the invokable service is determined, the IPDA 105 issues a command to the invokable service to execute a local ping command and send the result (e.g., first result) back to the IPDA 105. For example, the invoked service could ping itself (i.e., its own IP address) to return a time and send the time to the IPDA 105. Then, upon receiving the first result, the IPDA 105 performs a direct ping on the IP address of the invoked service to generate a second result, and compares the first result with the second result to determine whether the invokable service is automated, likely automated, or not automated. For example, the first result can be subtracted from the second result to generate a difference, and whether the invokable service is automated, likely automated, or not automated can be determined from the difference. If the ping call does not complete with a response, then it can be inferred that the other party is not a computer program (i.e., it is not automated). In an embodiment, when the difference is large (greater than a threshold), it is determined that the other party is not a program (i.e., not automated). In another embodiment, the above pinging is performed several times to create multiple consecutive differences, and it is determined that the other party is not a program (i.e., not automated) when an average of these differences is larger (i.e., greater than a threshold). In another embodiment, whenever the pings are successful, it is inferred that the other party is a computer program (i.e., automated).

The method then determines from a result of the ping command whether the service provider is not automated or whether the service provider is possibly automated (S602).

If the method determines that the service provider is not automated, the automation detector 422 returns a value informing the interaction manager 421 that the service provider does not have an automated agent (S603).

If the method determines that the service provider is possibly automated, the automation detector 422 issues a challenge test to the service provider (S604). The challenge test may be an effectiveness test or an efficiency test.

The method then determines from a result of the challenge test, whether the service provider is not automated or whether the service provider is possibly automated (S605).

In the effectiveness test, the automation detector 422 asks a question and detects which of a machine and a human is more likely based on the corresponding response received. In an efficiency test, the automation detector 422 asks a question and detects which of a machine or a human is more likely based on the amount of time it takes to receive the corresponding response or based on a number of attempts to provide the response. For example, if the automation detector 422 asks for pi to 15 digits, and the wrong response is received, it is likely to be a human. For example, if the automation detector 422 asks a question several times, and receives more than a threshold number of incorrect responses, it could determine that the service provider is not automated. The automation detector 422 may connect to an entity of the service provider using an address provided by the service provider on their website. For example, the website could provide a phone number, an email address, or an URL of a chatbot. If the channel allows free flow text (message) like a chatbot, the output from the automation detector 422 to the chatbot could include a text of a particular language (e.g., English, French, etc.). The address to connect could also be given by the UDDI directory of the service provider that defines a function that can be called by the automation detector 422. For example, if the automation detector 422 is invoking the function, the input format can be in WSDL.

If the method determines from the challenge test, that the service provider is not automated, the method notifies the interaction manager 421 that the service provider does not have an automated agent (S603).

If it is determined that an automated agent is potentially present from the result of the challenge, the automation detector 422 informs the interaction manager 421 that the service provider is likely automated (S606). For example, the automation detector 422 may return a value to the interaction manager 421 indicating that an automated agent is likely present.

While the automation detector 422 above uses ping as a means to determine whether the other party is automated, the inventive concept is not limited thereto. For example, another way of testing is to invoke each service with its input type (e.g., known from WSDL specification in UDDI directory) but with invalid data. For example, since the flight-Service( ) might expect a departure airport such as "JFK", an example of invalid data in this case might be "EARTH" or "MOON". Another example of invalid data would be enter a date in the past. The automation detector 422 can use the result of invoking the service with invalid data to determine whether the service is automated or not. In another embodiment, instead of using ping to determine whether the other party is automated, a traceroute or tracert command is used, which are computer diagnostic tools for displaying the route (path) and measuring transit delay delays of packets across an IP network. Ping, traceroute, and tracert rely on the underlying Internet ICMP standard to get network connectivity information.

Referring back to FIG. 6, the interaction manager 421 determines from a value received from the automation detector 422 whether the service provider is not automated or likely automated (S503).

If the interaction manager 421 determines from the value that the service provider is not automated, the interaction manager 421 requests human intervention (S504). For example, the interaction manager 421 could cause the mobile device 100-2 to vibrate or output an audible signal to notify the user 50 that their intervention is required.

If the interaction manager 421 determines from the value that the service provide is likely automated, then the interaction manager 421 discovers a protocol for interacting with an automated agent of the service provider (S505). A number of protocols may be used to perform the discovery such as the Web Services Description Language (WDSL), Semantically Annotated WDSL (SA-WSDL), PostScript/PDF, and Knowledge Interchange Format (KIF). If the interaction manager 421 is unable to discover the protocol, it may try to fill factoid information. For example, if the interaction manager 421 encounters a webpage that includes text fields requesting user information (e.g., name, mailing address, email address, phone number, etc.), the interaction manager 421 could automatically fill these fields with the corresponding data of the user, and then request human intervention.

The interaction manager 421 then invokes the workflow executor 423 using the discovered protocol (S506). The invoking may include updating the input workflow 410 with additional parameters to generate an interaction message and calling the workflow executor 423 with the interaction message.

Figure 8:
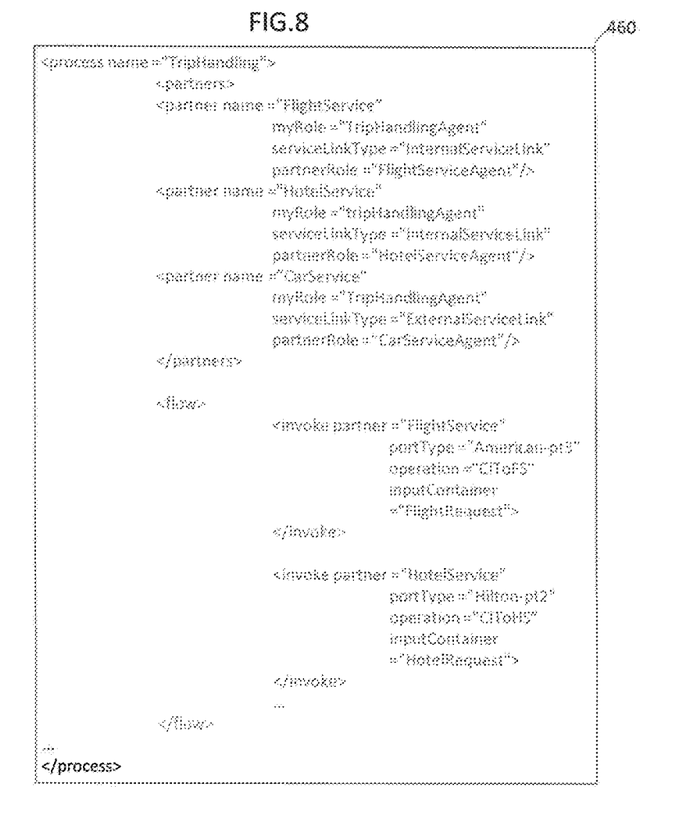
FIG. 8 illustrates the exemplary input workflow updated by the personal digital assistant according to an exemplary embodiment of the inventive concept.

FIG. 8 shows an example of the interaction message 460. For example, the interaction message 460 is similar to the input workflow 410, but additionally includes the port types and the operations. Now that the workflow executor 423 knows the identity of the operations and corresponding port types from the interaction message 460, it can call these operations using the above-described agent-directives to perform the corresponding user requested operations (e.g., book an airline ticket, a hotel reservation, a car rental, etc.).

Referring back to FIG. 6, the interaction manager 421 next determines whether its confidence in the results returned by the workflow executor 423 is above a threshold (S507).

If the confidence is not above the threshold, the interaction manager 421 requests human intervention (S504). The confidence could be low if the service provider switched from using an automated agent to using a human operator.

If the confidence is above the threshold, then the interaction manager outputs results of the workflow executor 423 (S509). For example, the results could identify the flight, hotel, and car that were booked.

Figure 9:
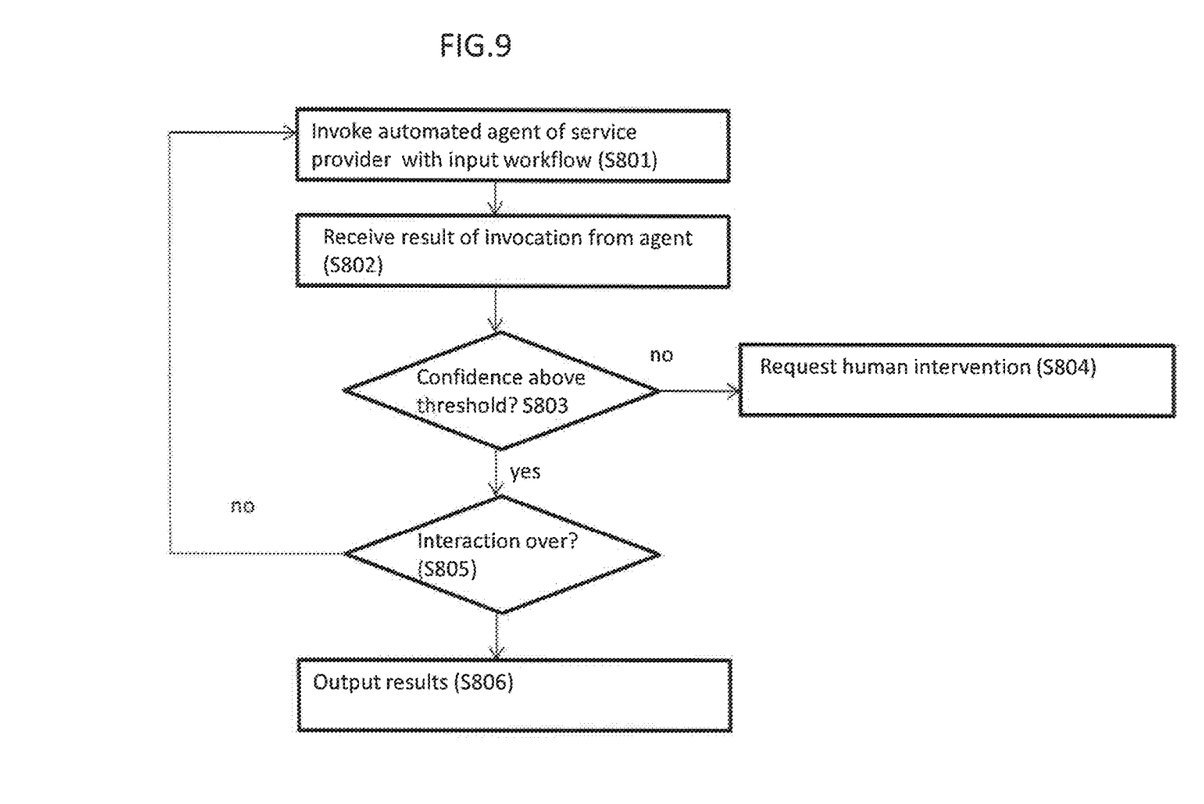
FIG. 9 illustrates a workflow executor of the interaction manager according to an exemplary embodiment of the inventive concept.

FIG. 9 illustrates a method of operating the workflow executor 423 according to an exemplary embodiment of the inventive concept. The method includes the workflow executor 423 invoking the automated agent using the discovered protocol and the data retrieved by from the interaction manager 421 that indicates the services requested by the user (S801). For example, the first invocation could involve invoking the automated agent of the service provider to book the airline ticket. The invoking may be performed by formatting a SOAP message using a WSDL format and sending the SOAP message to the automated agent.

The method then includes the workflow executor 423 receiving the results of invoking the automated agent of the service provider (S802).

The workflow executor 423 then determines a confidence in the results provided by the automated agent (S803). The confidence may be calculated in a number of different ways. For example, each interaction of the workflow executor 423 with the automated agent of the service provider could be timed, where longer interactions are penalized more greatly than shorter interactions. For example, a short interaction could receive a higher confidence than a shorter interaction.

The workflow executor 423 requests human intervention if the confidence is below a threshold (S804). The workflow executor 423 then determines the workflow includes a request to perform another service (S805). In this example, since only booking of the airline ticket has been performed, the method continues to step S801 to invoke the automated agent to perform the booking of the hotel. When all of the requested services have been performed, the method outputs all the results (S806).

Additionally, the workflow executor 423 may request human intervention whenever if it repeats a given state more than an acceptable number of times when interacting with the automated agent of the service provider, or when one of these interactions exceeds a pre-determined amount of time (e.g., a timeout occurs).

Figure 10:
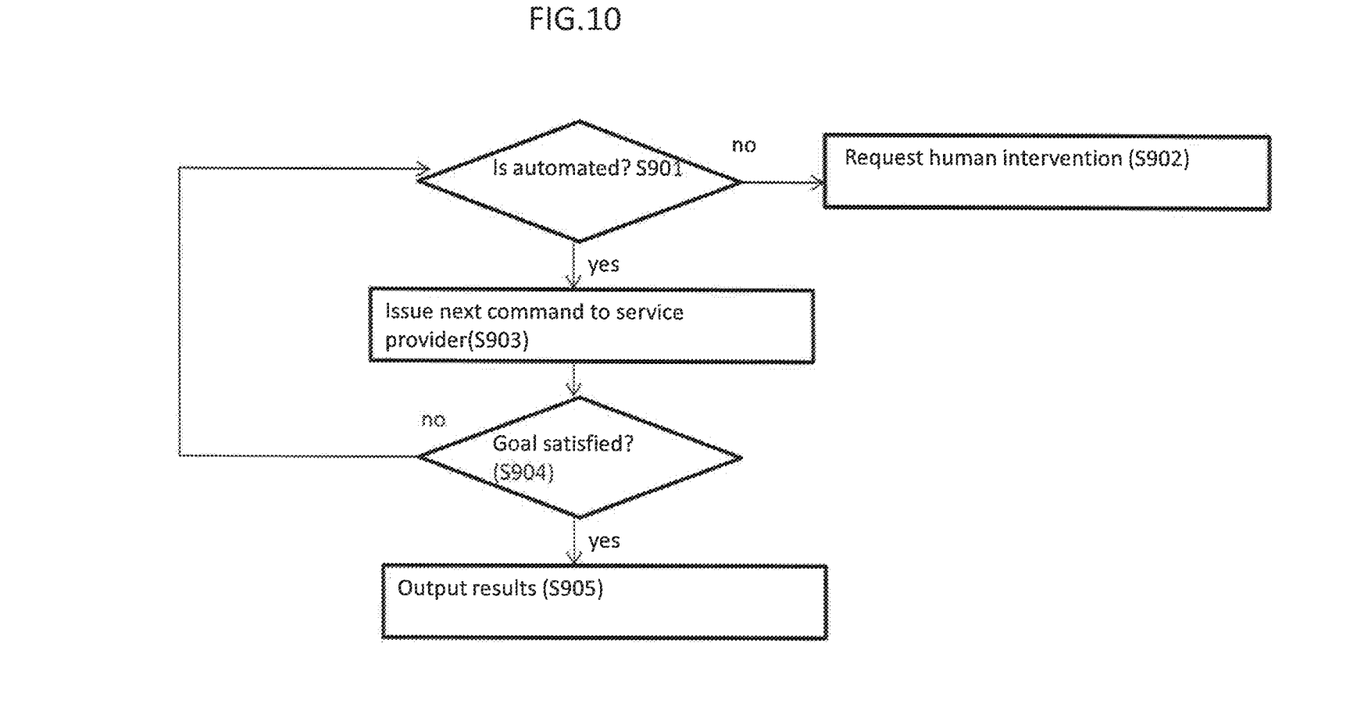
FIG. 10 illustrates a method of that may be used by a processor of the system according to an exemplary embodiment of the inventive concept.

FIG. 10 illustrates a method that may be performed by the IPDA 105 according to an embodiment of the invention. Referring to FIG. 10, the method includes the IPDA 105 performing an operation to determine whether the service provider is automated or not automated (S901). If the service provider is not automated, the IPDA 105 requests human intervention (S902). If the service provider is automated, then the IPDA 105 issues a first command among a set of commands to the service provide (S903). The entire set is needed to satisfy a particular goal (e.g., booking a flight, booking a car rental, and booking a hotel). The IPDA 105 rechecks whether the service provider is still automated (S901). If the service provider is still automated, the IPDA 105 issues a second command among the set to the service provider (S903). Steps S901 and S903 are performed until either human intervention is requested in step S902, or the goal of the interaction is satisfied. The IPDA 105 determines whether the goal is satisfied after each command is used (S904). For example, if all commands of the set have been issues successfully, it can be concluded that the goal has been satisfied. If the goal has been satisfied, the IPDA 105 outputs results of the interaction (S905). If the goal not been satisfied, the method resumes to step S901. If the goal has not been satisfied within a certain amount of time, the process can timeout and request human intervention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A personal digital assistant device comprising:
a memory storing an interactive personal digital assistant program; and
a processor configured to execute the interactive personal digital assistant program,
wherein the interactive personal digital assistant program performs an operation to determine whether a service provider is automated or is not automated,
wherein the interactive personal digital assistant program is configured to issue a command to the service provider on behalf of a user of the device, when it is determined that the service provider is automated, and
wherein the interactive personal digital assistant program is configured to issue an alert on the device when it is determined that the service provider is not automated,
wherein the operation instructs a Web Service of the service provider to perform a local ping and return a first result of the local ping to the personal digital assistant device, pings the Web Service to return a second result, and determines whether the service provider is automated or is not automated based on a comparison of a difference between the first and the second result to a threshold value; and wherein the service provider is determined to be automated when the difference between the first and the second result is less than the threshold value.

2. The personal digital assistant device of claim 1, wherein the device is a smartphone, smartwatch, or smartspeaker.

3. The personal digital assistant device of claim 1, wherein the operation searches a Universal Description Discovery and Integration (UDDI) directory to determine the Web Service of the service provider.

4. The personal digital assistant device of claim 1, wherein the command is derived from a message having an extensible markup language (XML) format that includes a tag identifying the Web Service of the service provider.

5. The personal digital assistant device of claim 4, further comprising a microphone, and the message is created in response to voice commands issued by the user through the microphone.

6. The personal digital assistant device of claim 4, wherein the interactive personal digital assistant updates the message to include an operation of the Web Service and a port type based on an analysis of a Universal Description Discovery and Integration (UDDI) directory.

7. The personal digital assistant device of claim 1, wherein after determining that the service provider is automated, the interactive personal digital assistant sends a query to an agent of the service provider, and the interactive personal digital assistant determines whether human intervention is required based on a reply to the query.

8. The personal digital assistant device of claim 7, wherein the interactive personal digital assistant issues another command of the user to the service provider when it is determined that human intervention is not required.

9. The personal digital assistant device of claim 7, wherein the interactive personal digital assistant issues an alert to the user when it is determined that human intervention is required.

10. The personal digital assistant device of claim 7, wherein the interactive personal digital assistant device determines that human intervention is required when the reply is received after longer than a predefined period of time.

11. The personal digital assistant device of claim 7, wherein the query includes a mathematical operation, and the interactive personal digital assistant device determines that human intervention is required when the reply includes an incorrect result to the operation.

12. A computer-implemented method for controlling a personal assistant device to interact with a service provider, the method comprising:

performing, by a processor, an operation to determine whether the service provider is automated or not automated;

issuing, by the processor, a command to the service provider on behalf of a user of the device when it is determined that the service provider is automated; and issuing, by the processor, an alert on the device when it is determined that the service provider is not automated, wherein the performing of the operation comprises the operation instructing a Web Service of the service provider to perform a local ping and return a first result of the local ping to the personal digital assistant device, pinging the Web Service to return a second result, and determining whether the service provider is automated or is not automated based on a comparison of a difference between the first and the second result to a threshold value; and wherein the service provider is determined to be automated when the difference between the first and the second result is less than the threshold value.

13. The computer-implemented method of claim 12, wherein the operation searches a Universal Description Discovery and Integration (UDDI) directory to determine the Web Service of the service provider.

14. The computer-implemented method of claim 12, wherein the command is derived from a message having an extensible markup language (XML) format that includes a tag identifying the Web Service of the service provider.

15. The computer-implemented method of claim 12, wherein after determining that the service provider is automated, the method comprises sending a query to an agent of the service provider and determining whether human intervention is required based on a reply to the query.

16. A computer program product for controlling a personal assistant device to interact with a service provide, the computer program product comprising a computer readable storage medium having program instructions embodied therewith, wherein the program instructions are executable by a processor to perform a method comprising:

performing, by the processor, an operation to determine whether the service provider is automated or not automated;

issuing, by the processor, a command to the service provider on behalf of a user of the device when it is determined that the service provider is automated; and issuing, by the processor, an alert on the device when it is determined that the service provider is not automated, wherein the performing of the operation comprises the operation instructing a Web Service of the service provider to perform a local ping and return a first result of the local ping to the personal digital assistant device, pinging the Web Service to return a second result, and determining whether the service provider is automated or is not automated based on a comparison of a difference between the first and the second result to a threshold value; and wherein the service provider is determined to be automated when the difference between the first and the second result is less than the threshold value.

17. The computer program product of claim 16, wherein the operation searches a Universal Description Discovery and Integration (UDDI) directory to determine the Web Service of the service provider.

* * * * *